Feb. 1, 1966     K. BRAND     3,232,628
VALVE ARRANGEMENT FOR THE MASTER CYLINDER
OF AN HYDRAULIC BRAKE ACTUATING SYSTEM
Filed Nov. 30, 1964     3 Sheets-Sheet 1

Inventor
Karl Brand
By Stevens, Davis, Miller + Mosher
Attorneys

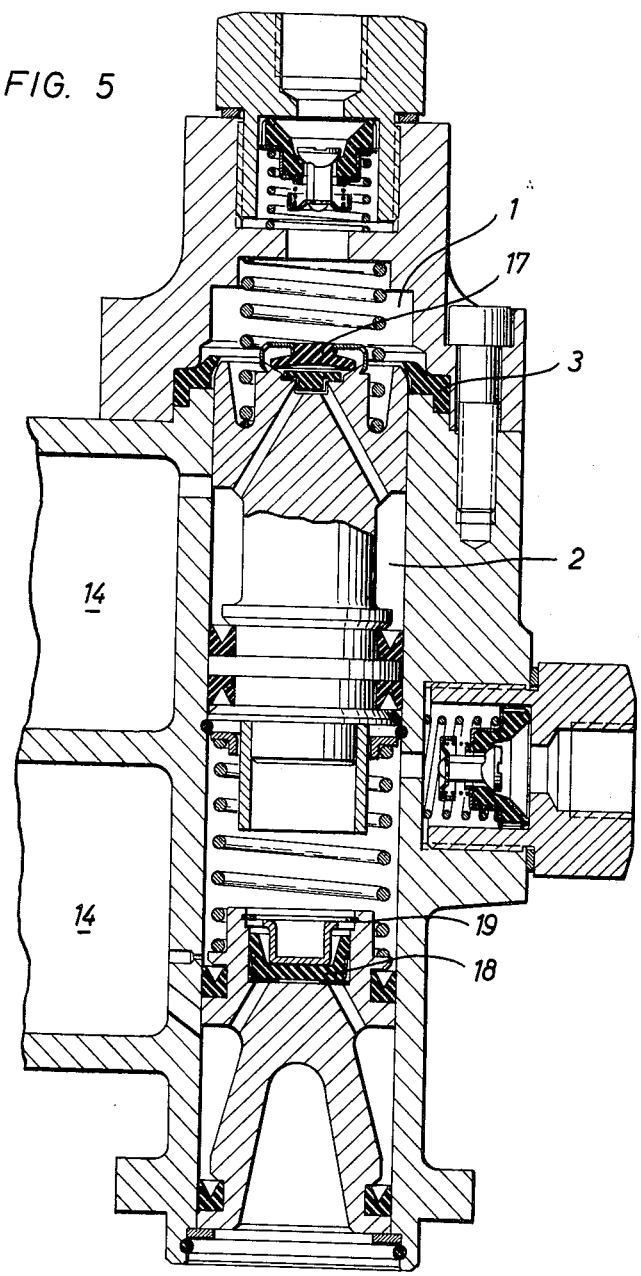

United States Patent Office 3,232,628
Patented Feb. 1, 1966

3,232,628
VALVE ARRANGEMENT FOR THE MASTER CYLINDER OF AN HYDRAULIC BRAKE ACTUATING SYSTEM
Karl Brand, Friedlandstrasse 6, Ebern, Germany
Filed Nov. 30, 1964, Ser. No. 414,587
Claims priority, application Germany, Jan. 25, 1964, K 51,940
2 Claims. (Cl. 277—212)

In the field of hydraulic power transmission systems, particularly the field of hydraulic actuating systems for the brakes of automotive vehicles, it has been common practice to provide a master cylinder comprising a low pressure stage and a high pressure stage. Upon the piston working in the high and lower pressure stages of the master cylinder being operated, the brake cylinders associated with the wheels of the vehicle are filled with the brake fluid, whereupon a change-over valve provided midway between the ends of the piston causes the pressure in the low pressure stage to be relieved. At the same time there is built up in the high pressure stage a greatly increased pressure, this pressure depending on the operating force applied and being transmitted to the wheel brake cylinders in order to apply the wheel brakes.

It has also been common practice to provide between the high pressure and the low pressure stages a valve which, upon the piston being operated, will successively permit the brake fluid to be transferred from the low pressure stage to the high pressure stage and will then isolate the high pressure stage from the low pressure stage. It has further been known to provide sealing cuffs which are arranged, upon the piston being operated, to be slid over the equalizing bore in the cylinder wall which allows the hydraulic medium to pass through. Such sealing cuffs which loosely engage the piston diameter are biased into contact with the piston by a suitable spring. This arrangement suffers from the disadvantage that the said spring is required to apply its pressure to the sealing cuff either directly or through the medium of a washer forming a seat for the spring. To avoid this drawback it has been proposed to cause the said spring to rest directly against the piston.

However, it has been found that even valve arrangements modified in the manner just indicated are not adapted to meet all requirements since the sealing cuff is subject to severe wear. To appreciate this, it should be understood that when the brake shoes of the wheel brakes have been adjusted for a travel of relatively short length in order to ensure satisfactory braking action a very small displacement only of the piston is required to fill the wheel brake cylinders and to produce an initial braking action. Upon the low pressure stage being relieved of the pressure prevailing therein, a high pressure will be built up in the high pressure stage, this causing the skirt portion of the sealing cuff to be forced into the equalizing bore. Any further movement of the piston will then subject the sealing cuff to severe abrasion and this phenomenon will soon cause the high pressure stage to break down. In order to remedy this situation, there have been proposed arrangements in which the said equalizing bores may be dispensed with in view of the fact that the non-return valve connecting the brake fluid reservoir to the low pressure stage is constructed as a suction and shut-off valve and that the annular sealing cuff for the piston is freely exposed. However, these known arrangements suffer from the drawback that any accumulation of dirt on the seat of the said suction and shut-off valve will prevent the necessary pressure from being built up by allowing part of the hydraulic medium to be displaced to escape past the leaky valve seat towards the brake fluid reservoir.

Moreover, the annular sealing cuff used in such an arrangement has been found to be unsatisfactory in view of the fact that its sealing lip, upon the piston passing through, will engage the piston so tightly that almost no liquid flow is allowed. Still another drawback of these known arrangements is to be seen in the fact that the sealing cuff is directly acted upon by a spring or a tubular insert.

In a valve arrangement for the master cylinder containing a single or twin piston and forming part of an hydraulic power transmission system, particularly of an hydraulic system serving to operate the wheel brakes of an automotive vehicle, the aforementioned drawbacks are avoided according to the invention by the provision of an annular sealing cuff which is provided with a central annular groove lying in a plane at right angles to the axis of the piston, the portion of the sealing cuff adjoining the annular groove terminating in a freely movable sealing lip. According to another feature of the invention, there may be provided, in addition to the annular sealing cuff a per se known suction valve built into the crown portion of the piston and followed by a change-over valve disposed midway between the ends of the piston. Furthermore, the annular sealing cuff may be disposed in a recess provided at the joint between two abutting members of the master cylinder, the master cylinder then being provided with an annular groove into which the sealing lip of the cuff extends. For the purpose of allowing the brake fluid to pass through, there may be provided longitudinal grooves extending parallel to the axis of the piston and terminating in the annular groove, or the internal diameter of the portion of the sealing cuff disposed upstream of the annular groove may be made larger than the external diameter of the co-operating piston. Preferably the edge of the end face of the piston co-operating with the sealing cuff is provided with a radius.

Other objects and features of the invention will become apparent as the description proceds, especially when taken in conjunction with the accompanying drawing, illustrating a preferred embodiment of the invention, wherein.

Figure 2:
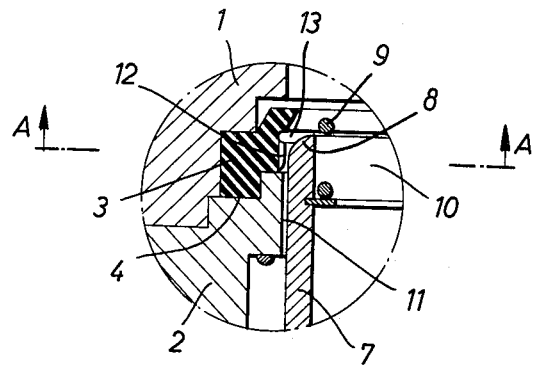
FIG. 2 is an enlarged portion of the showing in FIG. 1.
Figure 4:
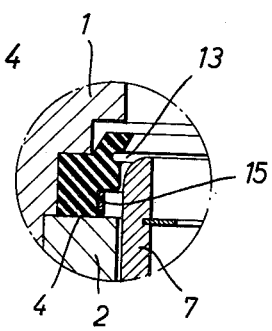

FIG. 4 resembles FIG. 2 but shows a modified embodiment of the invention, and

FIG. 5 is a longitudinal cross-sectional view of a master cylinder containing two pistons arranged in tandem.

Figure 1:
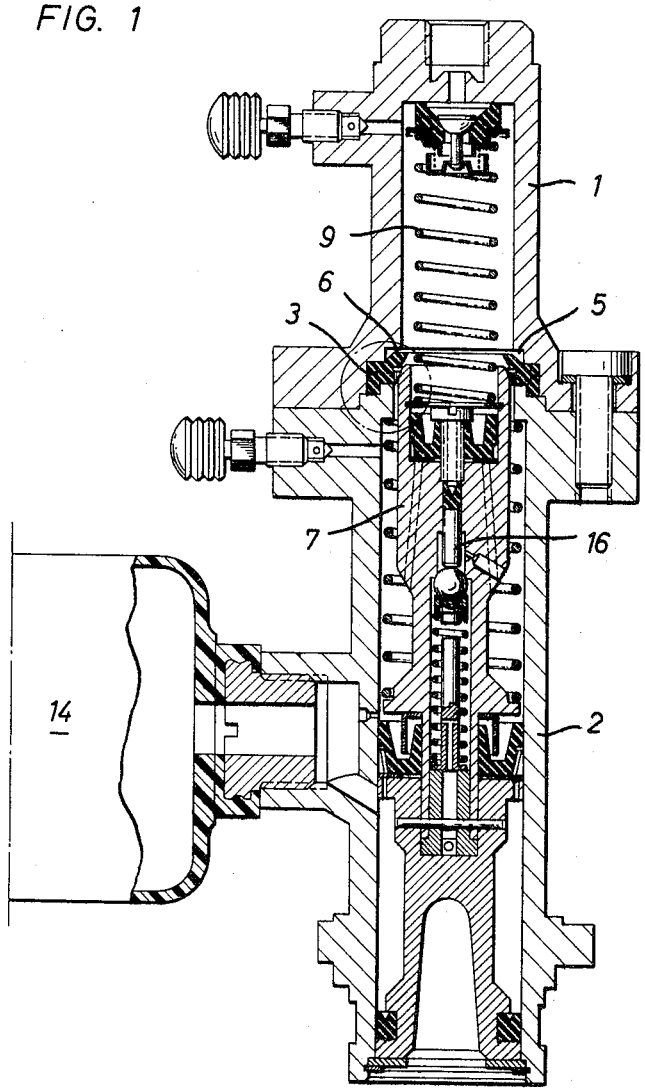
FIG. 1 is a longitudinal cross-sectional view of the master cylinder of an hydraulic brake system.

In the arrangement shown in FIG. 1, the high pressure cylinder 1 is rigidly connected to the low-pressure cylinder 2, the two cylinders forming parts of a two-stage master cylinder. A portion of the annular sealing cuff 3 is clamped in position between a spigot formed at the adjacent end of the low pressure cylinder and an enlarged portion of the high pressure cylinder. The end of the bore of the high pressure cylinder 1 facing the sealing cuff is provided with another enlarged portion 5 of slightly smaller diameter than the first-mentioned enlarged portion so as to permit unrestricted movement of the lip 6 of the sealing cuff upon the adjacent end of the piston 7 moving through the bore of the sealing cuff.

Figure 3:
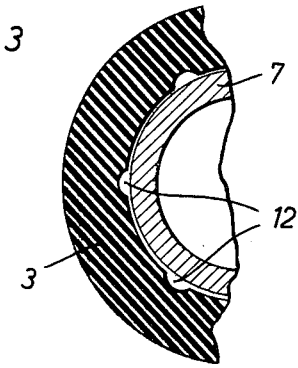
FIG. 3 is a transverse cross section along the line A—A in FIG. 2.

FIGS. 2 and 3 show, on an enlarged scale, the special construction of the sealing cuff which serves the dual function of perimtting easy passage of the brake fluid and of affording a satisfactory sealing action. Upon the radiused end of piston 7 being moved into the bore of sealing cuff 3, the lip 6 will sealingly engage the adjacent edge of the piston. The piston, during its upward movement, will compress a helical spring 9 disposed in an axial bore provided in the piston. This arrangement permits the use of an annular sealing cuff 3 which is not itself acted upon by a biasing spring. The brake fluid flowing fro mthe interior of the low pressure cylinder 2 to the interior of the high pressure cylinder 1 passes through the annular gap 11 existing between the bore of the low pressure cylinder and the piston 7. If necessary or desired, the flow area available for the brake fluid may be increased by the provision of longitudinal grooves in the wall of the cylinder bore. After passing the annular gap 11, then brake fluid flows through the longitudinal grooves 12 formed in the bore of the portion of the cuff facing the low pressure cylinder and enters an annular groove 13 formed in the innerwall of the sealing cuff and interconnecting the grooves 12. At the location of the annular groove 13 the sealing lip 6 is expanded throughout its circumference, the lip thus being moved into the enlargement of the adjacent end of the bore of the high pressure cylinder 1. As soon as the inflow of brake fluide into the high pressure cylinder is interrupted because the change-over valve 16 located midway between the ends of the piston connects the low pressure cylinder to the reservoir 14, the tension acting on the expanded sealing lip as well as the pressure built up in the high pressure cylinder 1 will cause the sealing lip sealingly to engage the outer diameter of piston 7. With the piston 7 occupying the position shown in FIG. 1, the brake fluid returning from the wheel brake cylinders can return to the reservoir 14 by way of the gap existing between the piston 7 and the sealing cuff 3.

According to the invention, the sealing cuff may also be arranged in the manner shown in FIG. 4 where the main portion of the cuff is seated in an annular groove 4 formed in the master cylinder, the said main portion being retained in position in the groove 4 by an annular spring or other suitable means. In the arrangement of FIG. 4, the inner diameter of the sealing cuff upstream of the annular groove 13 is larger than the diameter of the piston so that a sufficient amount of brake fluid can be displaced through the gap existing between the piston and the cuff.

The annular sealing cuff of the invention may also be provided for the purpose of sealing the low pressure stage of a two-stage master cylinder co-operating with a piston of the plunger type. Moreover, the valve arrangement of the invention may be advantageously used in a stepped cylinder of the tandem type or in a cylinder of uniform diameter containing two pistons working in a tandem arrangement as shown in FIG. 5. As also shown in FIG. 5, there may be provided, in addition to the annular sealing cuff 3, a per se known suction valve 17 which is mounted in the upper end of the respective piston. During the return of piston 7 into its starting position shown in FIG. 5, when the pressure in the low pressure cylinder 2 is higher than the pressure in the high pressure cylinder, brake fluid from the reservoir 14 will be drawn into the high pressure cylinder 1. Also in the case of the stepped master cylinder of FIG. 1 it may be of advantage additionally to provide a suction valve 18 of the type shown in FIG. 5 as part of the primary piston of the tandem cylinder, it being understood that the suction valve 18 is arranged upstream of the change-over valve 16 which is itself located half-way between the ends of the piston 7. In that case the helical compression spring 9 will rest against a snap ring or circlip 19 serving to retain the suction valve 18 mounted in a recess 10 at the upper end of the piston.

What is claimed is:

1. An annular piston operated sealing cuff for mounting in the wall of a cylinder, said cuff comprising an annular base portion having an internal annular first groove near the downstream face of said base portion and lying in a plane extending at right angles to the longitudinal axis of the piston, a set of additional internal grooves disposed upstream from said annular groove and extending in a direction parallel to the longitudinal axis of the piston, and a freely movable sealing lip integral with said base member and extending downstream from said first groove, the internal diameter of said lip being smaller than the piston diameter.

2. An annular piston operated sealing cuff for mounting in the wall of a cylinder, said cuff comprising an annular base portion having an internal annular groove near the downstream face of said base portion and lying in a plane extending at right angles to the longitudinal axis of the piston, and a freely movable sealing lip integral with said base member and extending downstream from said groove, the internal diameter of said lip being smaller than the piston diameter and the internal diameter of the cuff disposed upstream from said annular groove being larger than the piston diameter.

References Cited by the Examiner

UNITED STATES PATENTS

| 1,943,886 | 1/1934 | Carroll | 60—54.6 |
| 1,985,588 | 12/1934 | Tatter | 60—54.6 |
| 2,175,447 | 10/1939 | Rike | 60—54.6 X |
| 2,354,957 | 8/1944 | Loweke | 60—54.6 |
| 2,590,430 | 3/1952 | Risse | 60—54.6 |
| 2,820,347 | 1/1958 | Highland et al. | 60—54.6 |

FOREIGN PATENTS 815,973   7/1959   Great Britain.

SAMUEL LEVINE, *Primary Examiner.*

ROBERT R. BUNEVICH, *Examiner.*